United States Patent
Bennett et al.

(10) Patent No.: US 9,184,451 B2
(45) Date of Patent: Nov. 10, 2015

(54) POWER SUPPLY APPARATUS WITH RESERVE BATTERY MODULES AND METHOD FOR PROVIDING BACKUP POWER

(71) Applicants: EAGLEPICHER TECHNOLOGIES, LLC, Joplin, MO (US); CAMERON INTERNATIONAL CORPORATION, Houston, TX (US)

(72) Inventors: John Bennett, Joplin, MO (US); Greg Miller, Diamond, MO (US); Mike Parrot, Joplin, MO (US); Jim Ferraro, Baxter Springs, KS (US); Greg Kirk, Oronogo, MO (US); Dharmesh Bhakta, Joplin, MO (US); Donald S. Coonrod, Katy, TX (US); Tyler Smith, Mission, TX (US); Graham Schlanger, Katy, TX (US); Amber Tucker, Pearland, TX (US); Adam Castillo, El Paso, TX (US); Jennifer Gaines, Houston, TX (US); Kevin Havis, Fort Worth, TX (US); Michael Riemer, Houston, TX (US); Michael Pappas, Houston, TX (US); Thomas Vest, Midland, TX (US); Michael Boyd, New Caney, TX (US); Kelvin Singleton, Bryan, TX (US); Derek Redd, Cypress, TX (US)

(73) Assignee: Eaglepicher Technologies, LLC, Joplin, MO (US)

( * ) Notice: Subject to any disclaimer, the term of this patent is extended or adjusted under 35 U.S.C. 154(b) by 57 days.

(21) Appl. No.: 13/760,746

(22) Filed: Feb. 6, 2013

(65) Prior Publication Data

US 2014/0000904 A1     Jan. 2, 2014

Related U.S. Application Data

(60) Provisional application No. 61/664,882, filed on Jun. 27, 2012.

(51) Int. Cl.
| | |
|---|---|
| *H01M 2/10* | (2006.01) |
| *H01M 6/36* | (2006.01) |
| *E21B 33/035* | (2006.01) |
| *H01M 10/42* | (2006.01) |
| *H01M 10/44* | (2006.01) |
| *H01M 6/32* | (2006.01) |
| *H01M 6/38* | (2006.01) |
| *H01M 6/44* | (2006.01) |
| *H01M 16/00* | (2006.01) |

(52) U.S. Cl.
CPC ............... *H01M 6/36* (2013.01); *E21B 33/035* (2013.01); *H01M 2/10* (2013.01); *H01M 2/1016* (2013.01);
(Continued)

(58) Field of Classification Search
CPC ... H01M 2/10; H01M 2/1016; H01M 2/1077; H01M 2/1088; H01M 6/36
USPC .......................... 429/149, 156, 159, 112, 110
See application file for complete search history.

(56) References Cited

U.S. PATENT DOCUMENTS

| | | | |
|---|---|---|---|
| H985 H | * | 11/1991 | Christopulos .................... 429/99 |
| 2009/0286145 A1 | * | 11/2009 | Wan et al. ...................... 429/100 |

(Continued)

FOREIGN PATENT DOCUMENTS

| | | |
|---|---|---|
| EP | 0 211 409 A1 | 2/1987 |
| EP | 0 362 083 A1 | 9/1989 |
| WO | WO 2007/077642 A1 | 7/2007 |

OTHER PUBLICATIONS

Jun. 27, 2013 European Search Report issued in European Application No. PCT/US2013/048255.
Jun. 27, 2013 Written Opinion issued in European Application No. PCT/US2013/048255.

*Primary Examiner* — Zachary Best
(74) *Attorney, Agent, or Firm* — Sutherland Asbill & Brennan LLP

(57) ABSTRACT

A power supply apparatus has at least one modular reserve battery magazine with a plurality of compartments. A plurality of reserve battery modules may be respectively replaceably provided in corresponding ones of the plurality of compartments, each of the plurality of reserve battery modules being configured to provide power when a reserve battery provided therein is activated. Each reserve battery module of the plurality of reserve battery modules includes a sleeve and a reserve battery provided within the sleeve, the sleeve being configured to fit within one of the plurality of compartments in a predetermined orientation. Each sleeve may be detachably connectable within any compartment of the plurality of compartments and includes electrical connections so that each reserve battery module of the plurality of reserve battery modules is separately replaceable while the power supply apparatus remains remotely located.

36 Claims, 6 Drawing Sheets

(52) U.S. Cl.
CPC .......... *H01M 2/1077* (2013.01); *H01M 2/1088* (2013.01); *H01M 2/1094* (2013.01); *H01M 6/32* (2013.01); *H01M 6/38* (2013.01); *H01M 6/44* (2013.01); *H01M 10/425* (2013.01); *H01M 10/441* (2013.01); *H01M 16/00* (2013.01)

(56) References Cited

U.S. PATENT DOCUMENTS

2012/0088134 A1* 4/2012 Wood et al. ................ 429/90
2013/0229142 A1* 9/2013 Teodorescu et al. .......... 320/103

* cited by examiner

POWER SUPPLY APPARATUS WITH RESERVE BATTERY MODULES AND METHOD FOR PROVIDING BACKUP POWER

CROSS REFERENCE TO RELATED APPLICATION

This application claims the benefit of U.S. Provisional Patent Application No. 61/664,882, Jun. 27, 2012, which is incorporated by reference herein in its entirety.

BACKGROUND

This disclosure relates to power supply apparatus having multiple reserve battery modules to provide power in remotely accessible applications, and to their use. One example of such an application is to provide power (for example, backup power) for a subsea electrical power function such as in subsea oil and drilling applications where electrical power is needed for many purposes such as powering emergency blowout preventers, point of load electrical power distribution, hybrid power systems, supplemental power, critical system backup, etc. The invention is applicable to any electrical power function requiring the use of a battery that may degrade over time, thus making it advantageous to use one or more reserve batteries, which do not degrade until activation. Such batteries typically remain viable for decades.

Over time, primary batteries degrade causing a decrease in the batteries' ability to hold a charge and to deliver the charge to a load. Due to the primary battery's state of activation, the battery will lose efficacy as the battery ages. Similarly, rechargeable batteries degrade over time. While rechargeable batteries have the ability to be recharged, these batteries lose their ability to hold the same amount of original charge as the battery ages and/or is used. Further, rechargeable batteries require knowledge that the battery needs to be recharged as well as the time/ability to recharge the battery.

Due to the harsh environments encountered in subsea (including deepwater) applications such as salt water and high external pressure, subsea critical power applications require an electrical power source capable of ultrahigh reliability and ultralow maintenance and ease of remote replacement without bringing the device to the surface. During critical power needs, for example the action of enabling or disabling flow, reserve batteries offer an ultrahigh reliable solution for subsea electrical power applications and are proven in high reliability applications such as guided munitions, torpedoes and sonobuoys dating back to the 1940s. In order to enable battery reliability, low maintenance and ease of remote replacement, typical reserve batteries require unique alterations.

In view of the above, it is desirable to provide an electrical power source for diverse applications utilizing a plurality of reserve batteries that are easily and remotely replaceable. Reserve batteries are primary batteries which are inert until the battery is activated and used. More specifically, the active chemical components of a reserve battery are inactive until such time as the battery is needed, thus facilitating long storage life. Thus, reserve batteries are useful for applications requiring extended storage time because they avoid deterioration of the active materials during storage and eliminate the loss of capacity due to self discharge. Reserve batteries can be stored for 20 or more years and still provide full power when required.

It is thus desirable to provide a reserve battery system having reserve batteries that do not deteriorate when stored for long time periods so that the batteries will be immediately ready for use in critical situations.

SUMMARY

It would be advantageous to provide an apparatus and method for providing power from reserve battery modules to power, for example, a subsea system. Specifically, it would be advantageous to provide replaceable reserve battery modules that are electrically connected to a control system of an apparatus that powers the control system when the reserve batteries are activated. Thus, the reserve battery modules can be activated during critical situations when the normal power supply cannot supply adequate power to an apparatus. Furthermore, because the reserve battery modules are single use devices, it would be advantageous to provide reserve battery modules that are adapted to be easily replaced in their environment of use, which, for example, can be a high-pressure, harsh subsea environment. In addition, due to different power requirements, it is also desirable to provide multiple reserve battery modules such that one or more reserve battery module(s) can be activated as needed.

In accordance with one embodiment, a power supply apparatus is provided that has at least one modular reserve battery magazine that is provided with a plurality of compartments. A plurality of reserve battery modules respectively may be replaceably provided in corresponding ones of the plurality of compartments. Each of the plurality of reserve battery modules may be configured to provide power when a reserve battery provided therein is activated. Each reserve battery module of the plurality of reserve battery modules includes a sleeve and a reserve battery provided within the sleeve. The sleeve may be configured to fit within one of the plurality of compartments in a predetermined orientation. Each sleeve may be detachably connectable within any compartment of the plurality of compartments and may include electrical connections so that each reserve battery module of the plurality of reserve battery modules is separately replaceable while the power supply apparatus remains remotely located.

According to one aspect, the power supply apparatus includes an electrically powered control system for controlling the power supply apparatus. The power supply apparatus may also include a communication unit that communicates when at least one reserve battery module of the plurality of reserve battery modules is activated. The communication unit may be configured to communicate with an external control unit to remotely control the electrically powered control system. The communication unit may also be configured to communicate an output power of an activated reserve battery module of the plurality of reserve battery modules. The electrically powered control system may activate a predetermined number of reserve battery modules depending on an amount of power required. The electrically powered control system may be controlled by a central processing unit (CPU) that may determine when and how many of the reserve battery modules of the plurality of reserve battery modules to activate based the needs of the system being supported by the power supply apparatus. The electrically powered control system could be controlled by an operator, autonomously or manually by a ROV.

According to another aspect, the plurality of compartments in the at least one reserve battery magazine may include at least five compartments that are linearly aligned. The at least one reserve battery magazine may include a handle provided on one side surface thereof.

According to another aspect, a first reserve battery magazine may be attached to a base plate and at least one second reserve battery magazine may be attached to the first reserve battery magazine on a side opposite to the base plate in a stacked arrangement. Each of the one reserve battery magazines may be provided with one of a guide rail and a groove to facilitate stacking. The reserve battery magazines may be bolted together.

According to one aspect, the apparatus may include four reserve battery magazines that are stacked on top of each other to form an array of compartments, at least some of the compartments in the array having reserve battery modules disposed therein.

According to another aspect, an opening of each compartment may have a chamfered edge to facilitate installation of each sleeve within each compartment. Each sleeve may include a groove and an o-ring provided in the groove to lock each sleeve in place within the magazine compartment. In addition, each compartment may include a groove that aligns with the groove and o-ring provided on the sleeve when each reserve battery module is provided in the predetermined orientation. Each sleeve may also include a guide rail to facilitate positioning each sleeve within a corresponding magazine compartment in the reserve battery magazine. Each sleeve may have a chamfered edge to facilitate installation of each sleeve within each compartment. Each sleeve may be provided with a handle configured to be grasped by a robotic gripper.

According to one embodiment, the power supply apparatus may be provided as part of a subsea system that includes a blowout preventer for sealing a pipe of an oil drilling rig. The power supply apparatus may be provided in a subsea system that is disposed on a seafloor.

According to one aspect, the reserve batteries in the plurality of reserve battery modules may be selected from the group consisting of lithium alloy/iron disulfide thermal batteries, molten salt high temperature thermal batteries, silver zinc batteries, and lithium/oxyhalide batteries.

According to one embodiment, each reserve battery module of the plurality of reserve battery modules may include an electrically-activated activator. Alternatively, each reserve battery module of the plurality of reserve battery modules may include a mechanically-activated activator. The mechanically-activated activator may be a striker pin.

According to another embodiment, the electrical connections may be water-proof, high-pressure resistant connections. The power supply apparatus may be provided in a system that is at least one of a point of load electrical power distribution, a hybrid power system, and a critical system.

In one aspect, a primary battery may be electrically coupled to the control system. The reserve batteries in each of the plurality of reserve battery modules may be backup batteries that are connected to the primary battery such that the reserve batteries are only utilized when the primary battery is not able to support power requirements. The reserve batteries also may be electrically coupled to the control system. A secondary battery or capacitor bank could also be coupled to the control system.

Another embodiment includes a method of providing backup power with a power supply apparatus. The method may include replaceably electrically coupling at least one reserve battery module of a plurality of reserve battery modules in a respective compartment of at least one reserve battery magazine having a plurality of compartments, the at least one reserve battery magazine being provided in the power supply apparatus. The at least one reserve battery module may be configured to provide power when a reserve battery provided therein is activated. The at least one reserve battery module may include a sleeve and a reserve battery that is provided within the sleeve. The sleeve may be configured to fit within one of the plurality of compartments in a predetermined orientation. The sleeve may be detachably connectable within any compartment of the plurality of compartments and includes electrical connections so that the at least one reserve battery module is separately replaceable while the power supply apparatus remains remotely located.

According to one aspect, the method may include communicating when the at least one reserve battery module is activated. The method may also include receiving a command from an external control unit to remotely activate the at least one reserve battery module. Further, the method may include communicating an output power of an activated reserve battery module of the plurality of reserve battery modules. Furthermore, the method may include activating a predetermined number of reserve battery modules of the plurality of reserve battery modules depending on an amount of power required.

BRIEF DESCRIPTION OF THE DRAWINGS

Various exemplary embodiments of the disclosed power supply apparatus and method will be described in detail with reference to the following drawings in which.

DETAILED DESCRIPTION OF EMBODIMENTS

Exemplary embodiments are provided of apparatus and methods for using reserve batteries to provide backup or supplemental power to, for example, subsea applications. The invention is applicable to non-subsea application in addition to numerous subsea applications including, for example, point of load electrical power distribution, hybrid power systems, and any critical system back-up such as, for example, for powering (or providing back-up power to) emergency blowout preventers. Thus, although the invention will be described as used in a subsea application, this is just one example. The invention is applicable to various emergency situations, long term storage situations, and situations requiring reliability of the battery/batteries.

Figure 1:
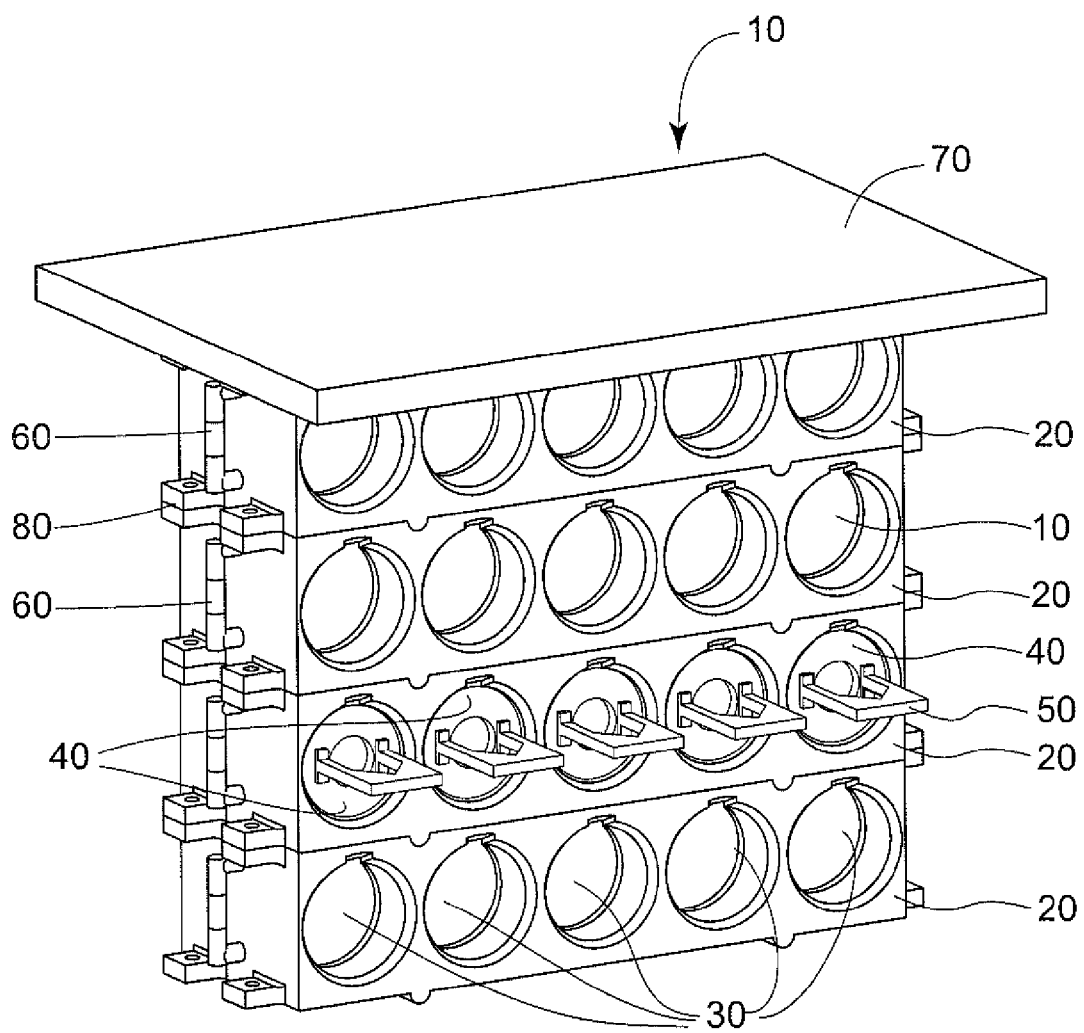
FIG. 1 illustrates a perspective view of a power supply apparatus according to one embodiment.

FIG. 1 is a perspective view of a power supply apparatus 10 according to one embodiment. The power supply apparatus 10 may include a plurality of modular reserve battery magazines 20 that may be stacked on top of one another (and remotely attached to each other). The reserve battery magazines 20 may be attached together by means of tab portions 80 provided on side surfaces of each of the reserve battery magazines 20. The tab portions 80 enable the reserve battery magazines 20 to be, for example, bolted together. As seen in FIG.

1, the uppermost reserve battery magazine 20 may be attached to a base plate 70. Each reserve battery magazine 20 includes a plurality of compartments 30. Each of the compartments 30 can receive a reserve battery module 40. In addition, each reserve battery magazine 20 may include a handle 60 that is provided on one side. The handles 60 are illustrated in FIG. 1 as being on the left side of each of the reserve battery magazines 60, but could be provided on the right side or on both sides. FIG. 1 illustrates reserve battery modules 40 provided in only one of the reserve battery magazines 20; however, reserve battery modules 40 can be provided in any or all of the compartments 30 illustrated in FIG. 1. FIG. 1 illustrates four reserve battery magazines 20 stacked on top of each other; however, the power supply apparatus 10 can include any number of reserve battery magazines 20 depending on the power needs of a particular application.

Figure 2:
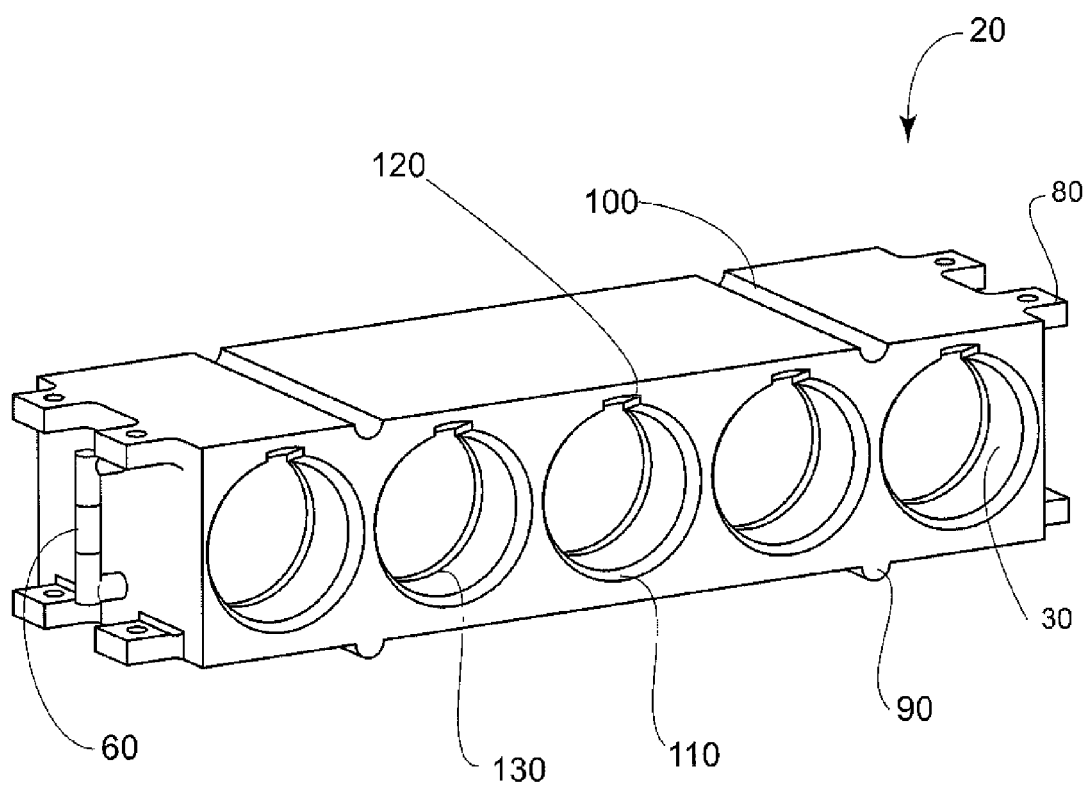
FIG. 2 illustrates one reserve battery magazine of the power supply apparatus according to one embodiment.

FIG. 2 illustrates a reserve battery magazine 20 according to one embodiment. As see in FIG. 2, the reserve battery magazine 20 may have five compartments 30 each of which is configured to receive a reserve battery module 40. Each of the compartments 30 may include a chamfered edge 110 and a guide slot 120 to facilitate insertion and proper orientation of a reserve battery module 40 into each magazine compartment 30. Each magazine compartment 30 may also have a slot 130 (a ring-shaped slot or groove) that serves as a locking mechanism to secure a corresponding reserve battery module 40 in place. A top and bottom of each reserve battery magazine 20 may be provided with at least one guide rail 90 and at least one groove 100 to ensure that the reserve battery magazines 20 will be assembled and combined properly. The guide rail 90 may alternatively be provided on the top of the reserve battery magazine 20 and the groove 100 may be provided on the bottom. The reserve battery magazine 20 may formed of a polymer such as an acetyl copolymer or any other material that is suitable for the intended environment of use. The handle 60 illustrated in FIGS. 1 and 2 is provided to allow a remotely operated vehicle (ROV) (not shown) to latch onto each reserve battery magazine 20 when it is desirable to remove/replace at least one of the reserve battery magazine 20 or one or more reserve battery module 40 provided therein.

It is preferable that the reserve battery modules 40 are individually detachable from and attachable to the reserve battery magazines 20, for example, via the ROV. It is also preferable that the reserve battery magazines 20 are detachable to and attachable from each other, for example, via the ROV. It is preferable to make the reserve battery modules 40 detachable/attachable (that is, replaceable) so that the reserve battery modules 40 can be replaced, for example, at the subsea location (for example, on the ocean floor). When the reserve battery modules 40 are used in a subsea application that will continue to operate even after the reserve battery modules 40 have been activated, it will be necessary to replace the spent reserve battery modules 40 with new ones after the old (spent) battery modules 40 have been activated. Thus, making the reserve battery modules 40/magazines 20 easily replaceable will avoid the need to remove the entire system powered by the power supply apparatus from the subsea location simply to replace the reserve batteries.

Figure 3:
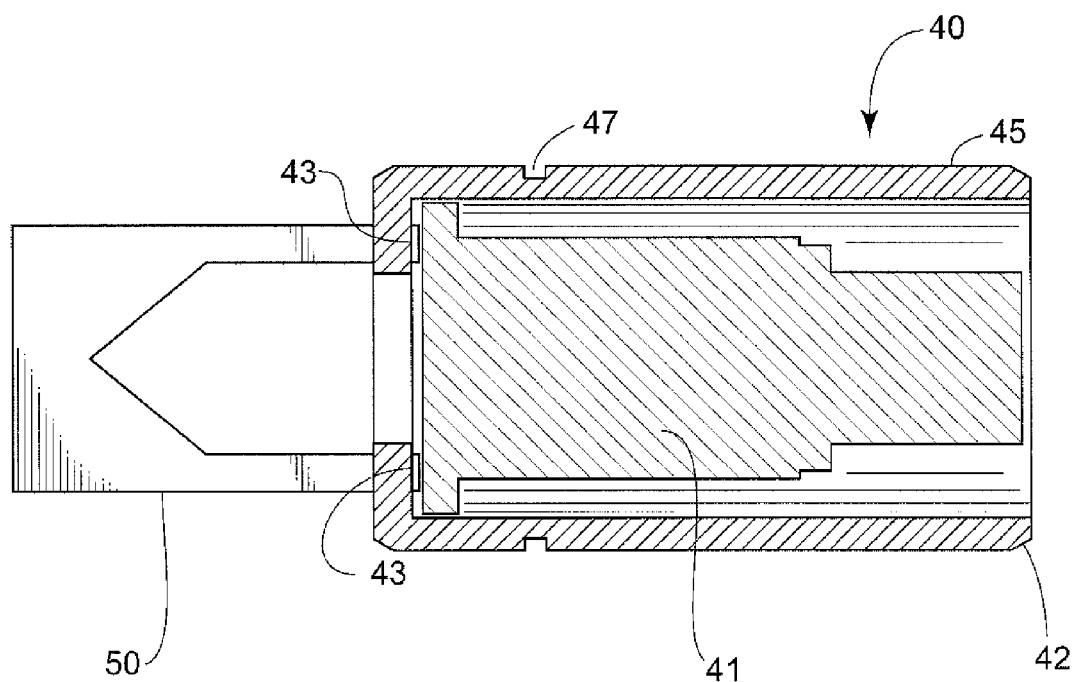
FIG. 3 illustrates a cross-sectional view of a reserve battery module according to one embodiment.

FIG. 3 is a cross-sectional view of one reserve battery module 40, which includes a reserve battery module handle 50, a reserve battery portion 41 and a sleeve 45. The sleeve 45 may have a circumferential recess 47 (groove) that is configured to receive an o-ring 49 (see FIG. 6). The sleeve 45 may also include a chamfered edge 42, which facilitates insertion of the reserve battery modules 40 within the compartments 30. Bolts and epoxy may be used to connect the reserve battery module handle 50 to the sleeve 45. The reserve battery portion 41 of the reserve battery module 40 may be formed of a metal casing that contains a battery material (such as a thermal battery) and the sleeve 45 may be formed of a polymer. Glass washers 43 may be provided to create a thermal break between the sleeve 45 and the reserve battery portion 41. The reserve battery module handle 50 allows the ROV to grab onto the reserve battery module 40. When the reserve battery module 40 is provided within the compartment 30 of the reserve battery magazine 20, the o-ring 49 and the circumferential recess 47 of the sleeve 45 match up with the groove 130 of the compartment 30 to lock the reserve battery module 40 in place. The o-ring 49 has a compressed load during insertion of the reserve battery module 40 within the compartment 30. However, the o-ring 49 is not compressed when the battery module 40 is locked within the compartment 30, and the o-ring 49 provides no sealing function.

Figure 4:
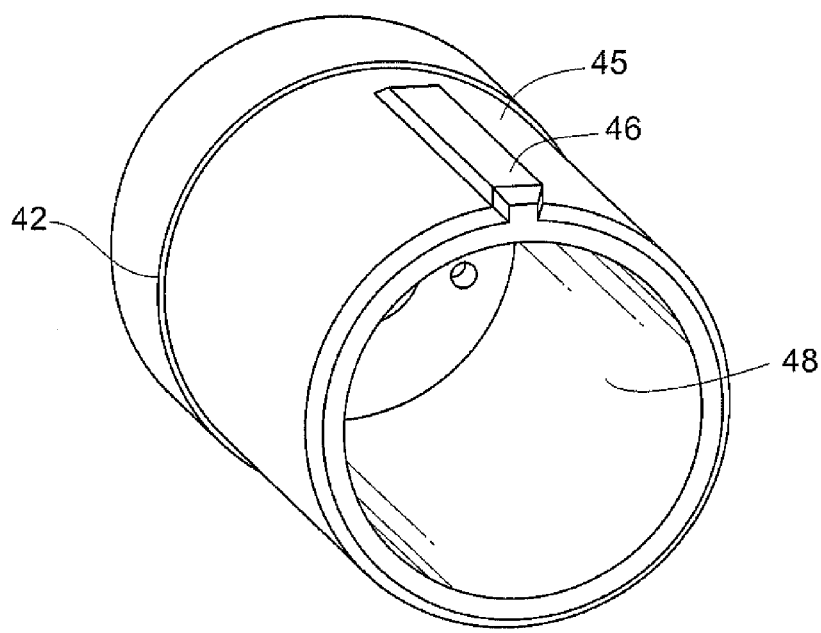
FIG. 4 illustrates a perspective view of part of a sleeve of a reserve battery module according to one embodiment.

FIG. 4 illustrates a perspective view of part of the sleeve 45. As seen in FIG. 4, the sleeve 45 includes an internal sleeve recess 48, into which the battery portion 41 is inserted, and an external sleeve guide rail 46 that matches the slots 120 in the compartments 30 and ensures that each reserve module 40 is inserted properly and with the correct orientation.

Figure 5:
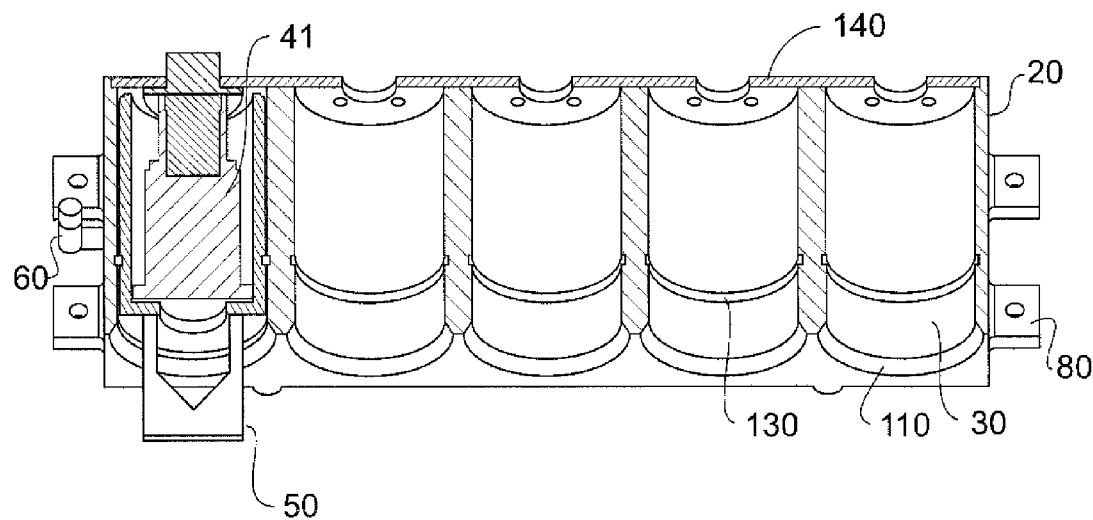
FIG. 5 illustrates a cross-sectional view of one reserve battery magazine having one reserve battery module disposed therein according to one embodiment.

FIG. 5 illustrates a cross-sectional view of one embodiment of the reserve battery magazine 20 with one reserved battery module 40 disposed in a compartment 30. A backplate 140 may be attached to each reserve battery magazine 20 to provide support for the mechanical-electrical connections between the batteries and with a control system 160 (see FIG. 7). The backplate 140 may be formed of metal.

Figure 6:
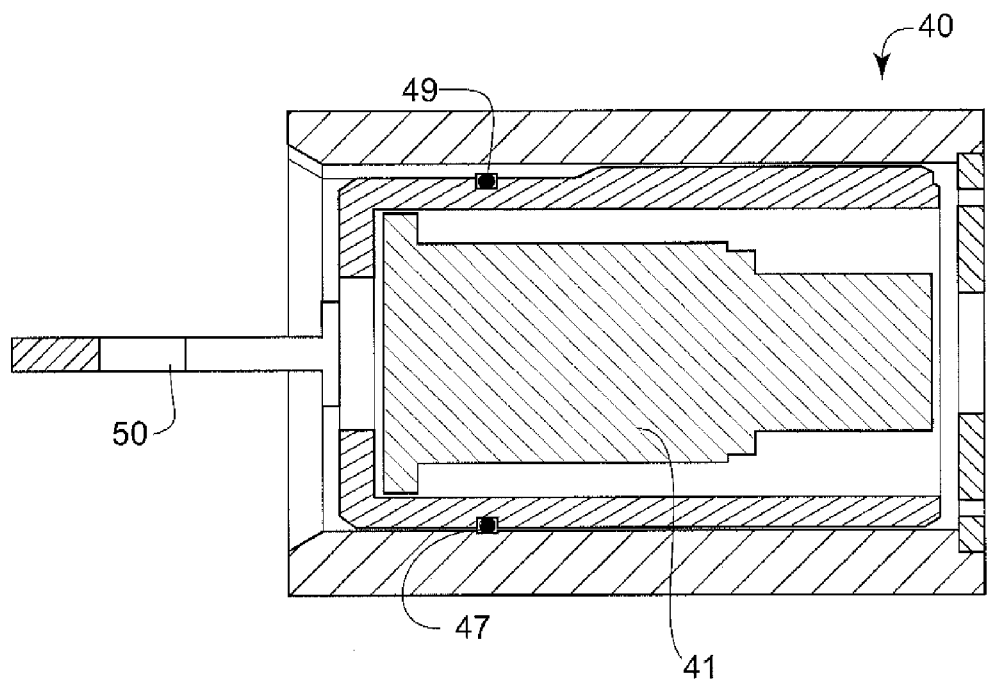
FIG. 6 illustrates another cross-sectional view of a reserve battery module according to one embodiment.

FIG. 6 illustrates a cross-sectional view of a reserve battery module 40 while in a locked arrangement within the compartment 30 through the interaction of the o-ring 49, the groove 130 and the circumferential recess 47. The o-ring 49 does not need to provide a seal between the reserve battery magazine 20 and the reserve battery modules 40, and may only provide a locking function. In particular, the o-ring 49, during insertion, squeezes and creates a compressive load that prevents the reserve battery module 40 from sliding out of the compartment 30 if the reserve battery magazine 20 is bumped or tipped at an angle. The o-ring 49 may be formed of Vitron, which can withstand a temperature range from −15° F. up to 400° F. Vitron is also highly resistive to aggressive chemicals and thus should not be degraded or otherwise negatively affected by a salt water environment such as would be found, for example, in subsea applications.

The reserve battery module 40 can be, for example, a lithium alloy/iron disulfide thermal battery, a molten salt high temperature battery (also called a thermal battery), a silver zinc battery, or a lithium/oxyhalide battery. Preferably, the reserve battery portion 41 of the reserve battery module 40 is a thermal battery. However, the reserve battery portion 41 is not limited to these chemistries. Instead, the reserve battery portion 41 can include any electrochemical configuration that allows for the segregation of the active chemicals of the cell such that activation of the battery is required before the battery becomes functional. One example of a reserve battery can be found in U.S. Pat. No. 7,504,177, the disclosure of which is herein incorporated by reference in its entirety.

The reserve battery portion 41 of the reserve battery module 40 may be activated by an external input that causes the electrolyte, which is segregated from the other electrochemical components of the reserve battery portion 41, to be released. Upon release of the electrolyte and contact with the other electrochemical components of the reserve battery portion 41, the energy of the reserve battery module 40 is available for use by the control system 160 (see FIG. 7). Because the reserve battery module 40 is not activated until needed, the reserve battery module 40 can be utilized in an emergency capacity.

The external input necessary to activate the reserve battery module 40 can be, for example, a short electrical pulse/trigger via an electrically-activated activator (not shown) or a mechanical input via a mechanically-activated activator (not shown). The mechanically-activated activator can be, for example, a striker pin. When the reserve battery portion 41 is a molten salt high temperature thermal battery, for example, the reserve battery module 40 is activated by igniting a pyrotechnic heat source within the battery using either the electrically-activated or the mechanically-activated activator.

Figure 7:
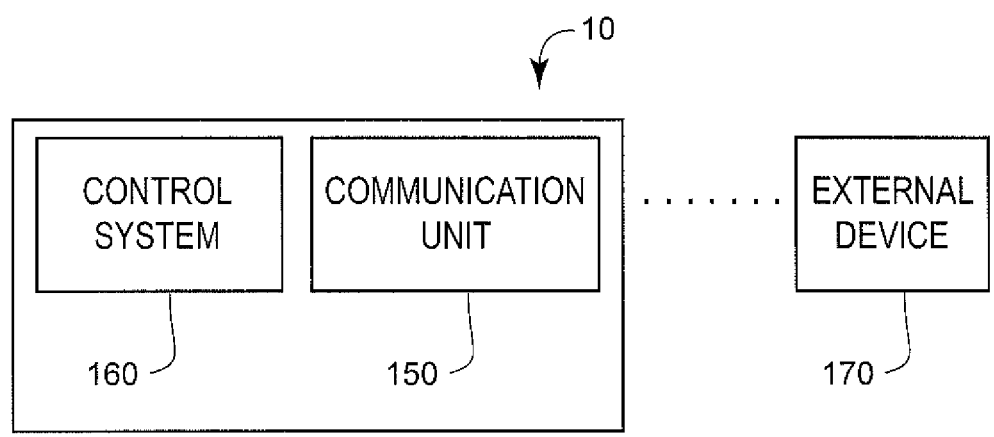
FIG. 7 illustrates a schematic diagram of how the power supply apparatus and an external device communicate according to one embodiment.

FIG. 7 illustrates a schematic diagram of one example of how the power supply apparatus 10 may communicate with an external device. As seen in FIG. 7, the power supply apparatus 10 includes the control system 160 and a communication unit 150. The communication unit 150 may communicate via a wired or wireless communication to an external device 170. The control system 160 can selectively activate one or more reserve battery modules 40 depending on the amount of power needed. In addition, the control system 160 can, through the communication unit 150, indicate to the external device 170 when and how many reserve battery modules 40 have been activated. Further, the control system 160 can be controlled remotely by the external device 170. The control system 160 may be controlled by a central processing unit (CPU) (not shown) that determines when and how many of the reserve battery modules 40 to activate based the needs of the system being supported by the power supply apparatus. The control system 160 could be controlled by an operator, autonomously or manually by a ROV.

Figure 8:
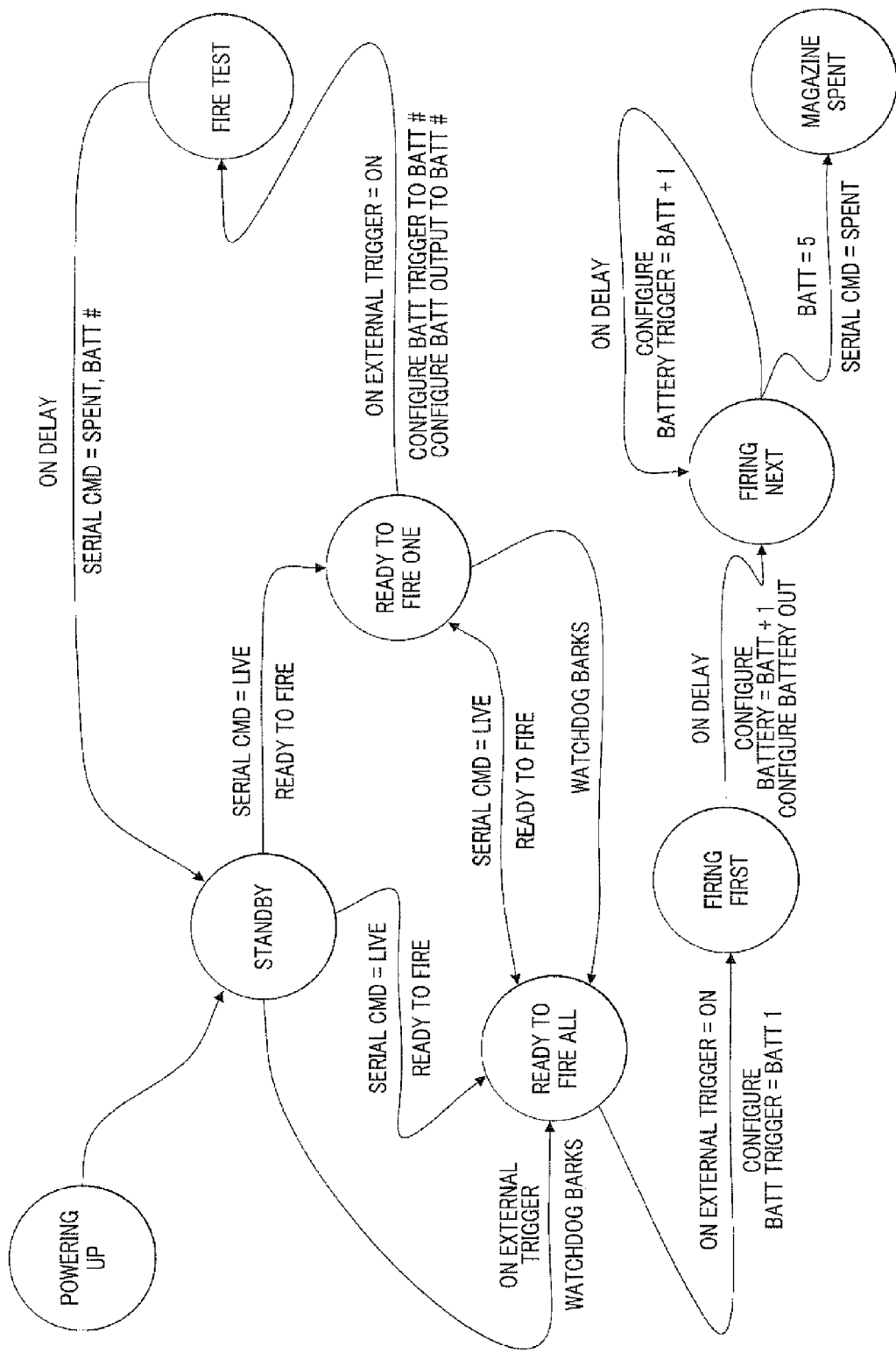
FIG. 8 illustrates a flowchart showing a transition between different activation states of the power supply system according to one embodiment.

FIG. 8 illustrates an example of a transition diagram that shows transition steps between different activation states of the power supply apparatus 10. Each circle represents a state that the power supply apparatus 10 can be in. For example, the initial state is "powering up." This is the first state that the power supply apparatus 10 will be activated. Afterwards, the power supply apparatus 10 goes to a standby mode. From this state, there are two options available "ready to fire all" and "ready to fire one." The single fire option is available so that operators can test the apparatus to ensure that it is operational. Once the system is in the "ready to fire all" state, the system can either revert back to "ready to fire one" or go into the sequence to fire all of the reserve battery modules 40. Some of the states have a watchdog function, meaning that if nothing happens for a period of time, the apparatus will automatically go onto the next state.

It is desirable that the reserve battery magazines 20 and the reserve battery modules 40 be designed to withstand a front impact of an ROV of 8,500 lbs. traveling at 0.5 knots. In addition, it is desirable that the reserve battery magazines 20 and the reserve battery modules 40 can withstand a one time dropped object impact of 5 kJ over a 100 mm2 area.

The illustrated exemplary embodiments of the apparatus and method for providing a backup power system set forth above are intended to be illustrative and not limiting. Various changes may be made without departing from the spirit and scope of the invention.

What is claimed is:

1. A power supply apparatus comprising:
at least one modular reserve battery magazine that is provided with a plurality of compartments; and
a plurality of reserve battery modules respectively replaceably provided in corresponding ones of the plurality of compartments, each of the plurality of reserve battery modules being configured to provide power when a reserve battery provided therein is activated, wherein
each reserve battery module of the plurality of reserve battery modules comprises a sleeve and a reserve battery provided within the sleeve,
each of the compartments and reserve battery modules defines corresponding guides that are configured to facilitate insertion of the reserve battery modules within the corresponding compartments at a predetermined orientation, each sleeve being detachably connectable within any compartment, and
each of the reserve battery modules includes electrical connections that are configured to enable each reserve batter module to be separately replaceable while the power supply apparatus is disposed in subsea conditions, and to enable each reserve battery of the replaceable reserve battery module to become activated subsequent to being inserted in the corresponding compartment at the predetermined orientation.

2. The power supply apparatus according to claim 1, further comprising:
an electrically powered control system for controlling the power supply apparatus.

3. The power supply apparatus according to claim 2, further comprising:
a communication unit that communicates when at least one reserve battery module of the plurality of reserve battery modules is activated.

4. The power supply apparatus according to claim 3, wherein
the communication unit is configured to communicate with an external control unit to remotely control the electrically powered control system.

5. The power supply apparatus according to claim 3, wherein
the communication unit is configured to communicate an output power of an activated reserve battery module of the plurality of reserve battery modules.

6. The power supply apparatus according to claim 2, wherein
the electrically powered control system activates a predetermined number of reserve battery modules depending on an amount of power required.

7. The power supply apparatus according to claim 1, wherein
the plurality of compartments in the at least one reserve battery magazine includes at least five compartments that are linearly aligned.

8. The power supply apparatus according to claim 1, wherein
the at least one reserve battery magazine includes a handle provided on one side surface thereof.

9. The power supply apparatus according to claim 1, wherein
the at least one reserve battery magazine is attached to a base plate and at least one other reserve battery magazine is attached to the at least one reserve battery magazine on a side opposite to the base plate in a stacked arrangement.

10. The power supply apparatus according to claim 9, wherein
the at least one reserve battery magazine and the at least one other reserve battery magazine are provided with one of the guides and a groove to facilitate stacking.

11. The power supply apparatus according to claim 1, wherein
the at least one reserve battery magazine comprises four reserve battery magazines that are stacked on top of each other to form an array of compartments, at least some of the compartments in the array having reserve battery modules disposed therein.

12. The power supply apparatus according to claim 1, wherein
an opening of each compartment has a chamfered edge to facilitate installation of each sleeve within each compartment.

13. The power supply apparatus according to claim 12, wherein
each sleeve includes a groove and an o-ring provided in the groove to lock each sleeve in place within the magazine compartment.

14. The power supply apparatus according to claim 13, wherein
each compartment includes a groove that aligns with the groove and o-ring provided on the sleeve when each reserve battery module is provided in the predetermined orientation.

15. The power supply apparatus according to claim 12, wherein
each sleeve includes a guide rail to facilitate positioning each sleeve within a corresponding magazine compartment in the at least one reserve battery magazine.

16. The power supply apparatus according to claim 1, wherein
each sleeve has a chamfered edge to facilitate installation of each sleeve within each compartment.

17. The power supply apparatus according to claim 1, wherein
each sleeve is provided with a handle configured to be grasped by a robotic gripper.

18. The power supply apparatus according to claim 10, wherein
the at least one reserve battery magazine and the at least one other reserve battery magazine are bolted together.

19. The power supply apparatus according to claim 1, wherein the power supply apparatus is provided as part of a subsea system that includes a blowout preventer for sealing a pipe of an oil drilling rig.

20. The power supply apparatus according to claim 1, wherein
the reserve batteries in the plurality of reserve battery modules are selected from the group consisting of lithium alloy/iron disulfide thermal batteries, molten salt high temperature thermal batteries, silver zinc batteries, and lithium/oxyhalide batteries.

21. The power supply apparatus according to claim 1, wherein
each reserve battery module of the plurality of reserve battery modules includes an electrically-activated activator.

22. The power supply apparatus according to claim 1, wherein
each reserve battery module of the plurality of reserve battery modules includes a mechanically-activated activator.

23. The power supply apparatus according to claim 22, wherein
the mechanically-activated activator is a striker pin.

24. The power supply apparatus according to claim 1, wherein
the electrical connections are water-proof, high-pressure resistant connections.

25. The power supply apparatus according to claim 2, further comprising:
a primary battery electrically coupled to the control system, wherein
the reserve batteries in each of the plurality of reserve battery modules are backup batteries connected to the primary battery such that the reserve batteries are only utilized when the primary battery is not able to support power requirements.

26. The power supply apparatus according to claim 1, wherein
the power supply apparatus is provided in a system that is at least one of a point of load electrical power distribution, a hybrid power system, and a critical system.

27. The power supply apparatus according to claim 1, wherein the power supply apparatus is provided in a subsea system that is disposed on a seafloor.

28. A method of providing backup power with a power supply apparatus, the method comprising:
replaceably electrically coupling at least one reserve battery module of a plurality of reserve battery modules in a respective compartment of at least one reserve battery magazine having a plurality of compartments, the at least one reserve battery magazine being provided in the power supply apparatus, wherein
the at least one reserve battery module is configured to provide power when a reserve battery provided therein is activated,
the at least one reserve battery module comprises a sleeve and a reserve battery that is provided within the sleeve that is detachably connectable within its respective compartment, the sleeve being configured to fit within one of the plurality of compartments,
the one of the plurality of compartments and the at least one reserve battery module define corresponding guides that are configured to facilitate insertion of the reserve battery module within the corresponding compartment at a predetermined orientation, and
the at least one reserve battery module includes electrical connections that are configured to enable the reserve batter module to be separately replaceable while the power supply apparatus is disposed in subsea conditions, and to enable the respective reserve battery of the replaceable reserve battery module to become activated subsequent to being inserted in the corresponding compartment at the predetermined orientation.

29. The method according to claim 28, wherein the power supply apparatus is provided in a subsea system that includes a blowout preventer for sealing a pipe of an oil drilling rig.

30. The method according to claim 28, wherein the power supply apparatus is provided in a subsea system that is disposed on a seafloor.

31. The method according to claim 28, further comprising:
communicating when the at least one reserve battery module is activated.

32. The method according to claim 28, further comprising:
receiving a command from an external control unit to remotely activate the at least one reserve battery module.

33. The method according to claim 28, further comprising:
communicating an output power of an activated reserve battery module of the plurality of reserve battery modules.

34. The method according to claim 28, further comprising:
activating a predetermined number of reserve battery modules of the plurality of reserve battery modules depending on an amount of power required.

35. A power supply apparatus comprising:
at least one modular reserve battery magazine that is provided with a plurality of compartments; and
a plurality of reserve battery modules respectively replaceably provided in corresponding ones of the plurality of compartments, each of the plurality of reserve battery modules being configured to provide power when a reserve battery provided therein is activated, wherein
each reserve battery module of the plurality of reserve battery modules comprises a sleeve and a reserve battery provided within the sleeve, the sleeve being configured to fit within one of the plurality of compartments in a predetermined orientation,
each sleeve is detachably connectable within any compartment of the plurality of compartments and includes electrical connections so that each reserve battery module of the plurality of reserve battery modules is separately replaceable while the power supply apparatus remains remotely located,
the at least one reserve battery magazine is attached to a base plate and at least one other reserve battery magazine is attached to the at least one reserve battery magazine on a side opposite to the base plate in a stacked arrangement, and
the at least one reserve battery magazine and the at least one other reserve battery magazine are provided with one of a guide rail and a groove to facilitate stacking.

36. The power supply apparatus according to claim 35, wherein
the at least one reserve battery magazine and the at least one other reserve battery magazine are bolted together.

* * * * *